United States Patent Office 3,766,289
Patented Oct. 16, 1973

3,766,289
REGENERATION OF A LOW SURFACE AREA DEHYDROGENATION CATALYST
Abraham D. Cohen, Sarnia, Ontario, Canada, assignor to Esso Research and Engineering Company
No Drawing. Filed Apr. 30, 1971, Ser. No. 139,264
Int. Cl. C07c 5/18
U.S. Cl. 260—669 R          7 Claims

ABSTRACT OF THE DISCLOSURE

In dehdrogenating an organic compound, i.e., ethylbenzene to styrene, in the vapor phase in the presence of sulfur oxide over a critically defined low surface area magnesium oxide catalyst, there can occur a loss in surface area of said catalyst such that the surface area of the magnesium oxide catalyst falls below the critically defined range so as to seriously affect the yield to the dehydrogenated product. The surface area of said catalyst employed in dehydrogenating the organic compound can be increased and thus brought within the critically defined range by contacting the magnesium oxide catalyst with $H_2O$, i.e., water and/or steam, at a temperature in the range of from about 33° to about 950° F., and thereafter calcining said $H_2O$-treated magnesium oxide catalyst at a temperature in the range of from about 800° to about 2000° F.

BACKGROUND OF THE INVENTION

Field of the invention

This invention relates to a process for increasing the surface area of a magnesium oxide catalyst, said catalyst being employed within a critically defined surface area range to dehydrogenate an organic compound in the vapor phase in the presence of sulfur oxides. More particularly, this invention relates to increasing and maintaining the surface area of a magnesium oxide catalyst within a critically defined range for effecting the dehydrogenation of an organic compound having at least one dehydrogenatable

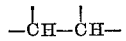

grouping, e.g., adjacent bonded carbon atoms with each carbon atom bonded to at least one hydrogen atom, in the vapor phase with sulfur oxides, i.e., $SO_2$ or $SO_3$ or water solutions thereof, by contacting said magnesium oxide catalyst with $H_2O$, i.e., water and/or steam at a temperature in the range of from about 33° to about 950° F., and thereafter calcining said $H_2O$-treated magnesium oxide catalyst at a temperature in the range of from about 800° to about 2000° F. In a typical embodiment, ethylbenzene is continuously dehydrogenated in high yields to styrene by contacting ethylbenzene with from about 0.2 to 0.7 moles of sulfur dioxide per mole of ethylbenzene in the presence of an inert diluent, i.e., steam, over a magnesium oxide catalyst having a surface area in the range of from about 4 to about 80 square meters per gram. Thereafter catalyst life is greatly extended while maintaining high yields to styrene by contacting the magnesium oxide catalyst with $H_2O$ at a temperature in the range of from about 33° to about 950° F. and thereafter calcining said $H_2O$-treated magnesium oxide catalyst at a temperature of about 800° to about 1800° F. for a period of time sufficient to increase and/or maintain the surface area of the magnesium oxide catalyst in the critically defined range of from about 4 to about 80 square meters per gram.

Description of the prior art

The catalytic vapor phase dehydrogenation of organic compounds to produce unsaturated or more highly unsaturated products in the feed in the presence of sulfur dioxide is an old and well known process; see, for example, U.S. Pat. No. 2,126,817. Generally, the overall endothermic reaction for the sulfur dioxide dehydrogenation of a hydrocarbon feedstock is in accordance with the following generalized formula:

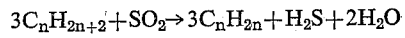

which shows that ⅓ mole of sulfur dioxide is theoretically required to dehydrogenate 1 mole of feedstock. While many processes have been reported, the commercial development of a sulfur dioxide process has been rather permanently delayed due to serious problems involving catalyst life. Thus, it is believed that, while dehydrogenation is the principal reaction occurring, a portion of the feedstock and product is being simultaneously degraded to form coke. This coke is formed at the surface of the catalyst, thereby shielding the catalyst from the reactants and causing rapid catalyst deactivation. The coke reaction is further promoted by the presence of sulfur-containing compounds which are known to promote coking at reaction temperatures and are generally present due to side reactions between the hydrocarbon and sulfur dioxide. See, for example, U.S. Pat. No. 3,299,155 and Japanese Pat. No. 468,503, wherein the mole ratio of sulfur dioxide to hydrocarbon charge is maintained at from about 1:1 to about 2:1 and about 1.3:1, respectively. Furthermore, when sulfur levels below those claimed are employed, such as to a process stoichiometric equivalent, there is a significant loss in yield to the desired dehydrogenated compound (see Japanese Pat. No. 468,503, Table I). Consequently, the use of such high sulfur levels, in addition to drastically reducing catalyst life by promoting coke formation, significantly reduces the conversion level and selectivity and thus the yield to the desired hydrogenated compounds. Furthermore, it is highly desirable in commercial applications to employ an inert diluent to reduce hydrocarbon losses to burning, coke and heavy products. Preferably, this inert diluent is steam in order to facilitate a relatively easy product recovery system. Unfortunately, the catalyst reported in the prior art is severely deactivated in the presence of steam (see, for example, Adams, C. R., American Chemical Society, Division of Petroleum Chemical Preprints, page C9, Figure 4, New York City meeting, September 1969). In copending applications U.S. Ser. Nos. 780,528 and 886,582, filed on Dec. 2, 1968, and Dec. 19, 1969, respectively, I. S. Pasternak, N. J. Gaspar, A. D. Cohen and M. Vadekar, inventors, a process has been described which tends to eliminate or substantially inhibit cracking and/or burning reactions and allows the use of sulfur oxide approaching the theoretical more closely than has been believed possible by the prior art for the conversion and yields obtained. U.S. Ser. Nos. 780,528 and 886,582, the pertinent disclosures of which are incorporated herein by reference, disclose the dehydrogenation process which comprises dehydrogenating a compound having at least one

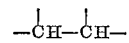

grouping, wherein the adjacent carbon atoms are bonded to each other and have at least one hydrogen atom attached to each carbon atom such as in the ethyl group of ethylbenzene, by contacting such compounds with sulfur oxides, i.e., $SO_2$ or $SO_3$ or water solutions thereof in the presence of an inert diluent, preferably steam, over a critically defined low surface area catalyst. Preferably, the catalyst is a magnesium oxide catalyst having a surface area in the range of from about 4 square meters per gram to about 80 square meters per gram. Periodically for example, after about 12 to 24 hours on stream, the low surface area catalyst, i.e., magnesium oxide, is regenerated to remove any coke that may have formed on the surface of the catalyst by removing the ethylbenzene and sulfur oxide reactants from the reaction zone and thereafter passing oxygen or an oxygen-containing gas such as air along with steam to burn off the carbonaceous deposits. However, after approximately 20 to 40 of the above-described regeneration cycles, or even earlier if the regeneration procedure is not carefully controlled and/or the catalyst contains sintering aids, there can occur a loss in the surface area of the catalyst such that the surface of the catalyst falls below the critically defined range so as to seriously affect the yield to the dehydrogenated product and ultimately necessitate replacement of the catalyst. By the process of this invention, however, the necessity to replace the catalyst is alleviated and a truly continuous dehydrogenation process is realized by increasing the surface area of the magnesium oxide catalyst as required to maintain high yields to the desired dehydrogenated product by maintaining the surface area of the magnesium oxide catalyst within its critically defined and preferred surface area ranges.

SUMMARY OF THE INVENTION

In accordance with this invention, an improved continuous process is provided for the vapor phase dehydrogenation of dehydrogenatable organic compounds which comprises reacting the dehydrogenatable compounds with a sulfur oxide in the presence of an inert diluent over a critically defined low surface area magnesium oxide catalyst having a surface area within the range of from about 4 to about 80 square meters per gram and thereafter maintaining the surface area of the magnesium oxide catalyst within the critically defined surface area range by contacting said magnesium oxide catalyst with $H_2O$ and thereafter calcining the water-treated magnesium oxide catalyst at a temperature within the range of from about 800° to about 1800° F.

As disclosed in copending U.S. application Ser. Nos. 780,528 and 886,582, it is believed that the success of the process described herein is due in large part to the discovery that low surface area catalysts are selective in promoting the desired reaction and tend to minimize hydrocarbon burning and coke formation. The use of such catalysts is a reversal from the general trend in catalysis. Since high surface area catalysts have been used successfully in endothermic reactions, it would appear reasonable to believe that they could be effectively used in the endothermic sulfur dioxide dehydrogenation of a hydrocarbon feedstock. Nevertheless, it has been found that high surface area catalysts are ineffective and that low surface area catalysts are essential to practice the process of the instant invention. Thus, high surface area catalysts tend to increase (catalyze) the rate of burning reactions, e.g.,

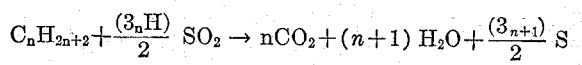

thereby giving rise to two major disadvantages. First, since the burning reaction will require far more $SO_2$ per mole of dehydrogenatable organic compound than the desired dehydrogenation reaction, burning of only a small amount of hydrocarbon removes a large amount of $SO_2$ from the system and makes it unavailable for dehydrogenation, whereas dehydrogenation with $SO_2$ is endothermic, any amount of burning will tend to heat the catalyst bed resulting in either localized or generalized hot spot formation. The hot spots then will tend to increase the rate of burning and cracking reactions as well as increase the catalyst fouling due to coke formation. Thus, hot spots give rise to both a lower yield of desired products and rapid catalyst deactivation.

Accordingly, it is essential to employ a low surface area catalyst for the reaction described herein. This requirement is necessitated by the fact that the catalyst must be selective to the desired reaction while inhibiting undesired side reactions such as cracking and/or burning. As disclosed in copending application U.S. Ser. No. 886,582, when the diluent employed in the instant process is steam, or essentially all steam, a critical magnesium oxide surface area range exists within which the yield of dehydrogenated product is markedly greater than would ordinarily be expected.

As mentioned above, it is essential in commercial applications to employ an inert diluent to reduce the partial pressure of the reactants in the reaction zone in order to prevent undue loss of hydrocarbons to burning, coke and heavy products. Thus, the use of an inert diluent, by minimizing hydrocarbon losses to coke, significantly increases the catalyst life to achieve continuous high conversion and selectivity levels to the desired dehydrogenated products. It is preferred, for economic reasons, to use as much condensable diluent, i.e., steam, as possible to facilitate product separation without resorting to extensive refrigeration techniques which must be used when non-condensable diluents, such as when nitrogen or carbon dioxide, are employed. When steam is employed as the inert diluent, a critical surface area range starting above a threshold surface area of about 4 square meters per gram exists for magnesium oxide at which the yield of dehydrogenated product increases by about ten-fold. A critical upper surface area limit where product yield falls off sharply does not exist for the magnesium oxide catalyst since the upper limit depends upon the reaction temperatures employed. When the reaction temperatures above about 1000° F. are employed, after about 6 hours reaction time the surface area of the magnesium oxide catalyst stabilizes below 80 square meters per gram. Consequently, it is preferred that the magnesium oxide catalyst have a surface area ranging from about 4 to 80 square meters per gram, more preferably from about 10 to about 70 square meters per gram, and still more preferably from about 20 to about 60 square meters per gram.

The advantages of discovering this critical surface area level for magnesium oxide, in which yields are markedly increased, are manifest. However, it is necessary in order to maximize yields to the desired hydrogenated product to regenerate the magnesium oxide catalyst after approximately 12 to 24 hours on stream in order to remove any coke that may have been formed on the surface of the catalyst. The magnesium oxide catalyst is regenerated by removing the feedstock, i.e., ethylbenzene in sulfur oxide reactant from the reaction zone and thereafter passing oxygen or an oxygen-containing gas such as air along with steam to burn off the carbon deposits which may have formed on the surface of the catalyst. During these regeneration cycles, the temperature in the reaction zone can be increased, i.e., in the range of from about 1500° to about 1800° F., which temperature is significantly above the reaction temperatures normally employed, i.e., 900° to 1200° F. The effect of such temperatures in the reaction zone during the regeneration cycles, i.e., 1500 to 1800° F., have the effect of lowering the surface area of the magnesium oxide catalyst. Thus, after prolonged use under reaction conditions and/or the relatively high temperature attained during the regeneration step, the surface area of the magnesium oxide catalyst may eventually fall below the most preferred surface area range for magnesium oxide, i.e., 20 to about 80 square meters per gram, and may even approach the critically defined limit, i.e., about 4 square meters per gram, which is required in order to selectively form the desired dehydrogenated product. In addition, based on practical and economic considerations, it is preferred to maintain the surface area of the magnesium oxide catalyst above 20 square meters per gram.

Accordingly, it has now been discovered that the surface area of a magnesium oxide catalyst may be significantly increased by treating the low surface area magnesium oxide catalyst with $H_2O$ at a temperature in the range of from about 33 to about 950° F. The $H_2O$-treated magnesium oxide catalyst is then calcined at a temperature of about 800° to about 2000° F. More preferably, the surface area of a spent magnesium oxide catalyst, by which is meant that magnesium oxide catalyst which is employed in dehydrogenation of an organic compound in the vapor phase in the presence of a sulfur oxide, as described above, and while being employed in said process, suffers a loss in surface area below about 20 square meters per gram, can be increased by contacting said spent magnesium oxide catalyst with steam at a temperature in the range of from about 212° to about 600° F., and thereafter calcining said steam-treated spent catalyst at a temperature in the range of from about 850° to about 1800° F. for a period of time sufficient to either maintain or increase the surface area of said spent catalyst to within the preferred range of 20 to about 60 square meters per gram. Preferably, the calcining is carried out by subjecting the $H_2O$-treated spent magnesium oxide catalyst to reaction temperatures, namely 900° to 1100° F., for a period of time sufficient to increase the surface area of said catalyst within the preferred dehydrogenation range, i.e., 20 to 60 square meters per gram.

While not wishing to be bound to any particular theories, we believe that the surface area of magnesia is a measure of the accessability of gas to the faces of small cubic crystallites. Accordingly, a decrease in surface area occurs at temperatures well below the 2400° C. melting point of magnesia by virtue of the fact that small cubic crystallites become more closely packed. Consequently, the water-treatment of the magnesia is believed to result in the formation of magnesium hydroxide on the surface of the crystallites. Subsequent low temperature calcination removes the water and leaves substantial spaces between formerly closely packed crystallites which results in increased surface area. Accordingly, the practice of this water-treatment and subsequent calcination of the magnesium hydroxide catalyst in situ will greatly prolong catalyst life by maintaining the surface area of the magnesium oxide catalyst within the desired critical range in order to maintain high yields to the desired dehydrogenated product.

The process of this invention can be applied to a great variety of dehydrogenatable organic compounds to obtain the unsaturated derivatives thereof. A suitable dehydrogenatable compound can be any organic compound that contains at least one

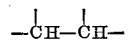

grouping, i.e., adjacent carbon atoms bonded to each other and each attached to at least one hydrogen atom. Preferably, such compounds have from 2 to about 20 carbon atoms. In addition to carbon and hydrogen, these compounds may also contain oxygen, halogen, nitrogen and sulfur. Among the classes of organic compounds which can be dehydrogenated by this process are: alkanes, alkenes, alkyl halides, ethers, esters, aldehydes, ketones, organic acids, alkyl aromatic compounds, alkyl heterocyclics, cyanoalkanes, cyanoalkenes, and the like. Illustrative, nonlimiting examples include: ethylbenzene to styrene, isopropylbenzene to alpha-methyl styrene, cyclohexane to benzene, vinyl cyclohexane or vinyl cyclohexene to styrene, chloroethylbenzene to chlorostyrene, ethane to ethylene, n-butane to butenes and butadiene, butene to butadiene, isobutane to isobutylene, methyl butene to isoprene, propionaldehyde to acrolein, ethyl chloride to vinyl chloride, propionitrile to acrylonitrile, methyl isobutyrate to methyl methacrylate, propionic acid to acrylic acid, ethyl pyridine to vinyl pyridine, ethyl- phenol to vinylphenol, and the like. Preferred dehydrogenation feed stocks are the $C_2$-$C_{20}$ hydrocarbons, i.e., paraffins, alkyl benzenes, alkyl and alkenyl substituted cycloaliphatic compounds and monoolefins. Particularly preferred, however, are $C_2$-$C_9$ paraffins, $C_3$-$C_9$ monoolefins, $C_8$-$C_{16}$ alkyl benzenes, and $C_8$-$C_{16}$ alkyl and alkenyl substituted cycloaliphatic compounds; still more particularly $C_4$-$C_8$ monoolefins and paraffins, $C_8$-$C_{10}$ alkyl benzenes, and $C_8$-$C_{10}$ alkyl and alkenyl substituted cycloaliphatic compounds. Particularly effective as feed stocks are the olefinic hydrocarbons or alkyl benzenes or vinyl substituted cycloaliphatics which may be dehydrogenated to provide a product wherein the major unsaturated product has the same number of carbon atoms as the feed hydrocarbon. Ethylbenzene is a particularly preferred dehydrogenatable compound and its reaction with sulfur dioxide in accordance herewith results in ethylbenzene conversions in excess of 75% preferably 80%, and more preferably 85%, with selectivity to styrene in excess of 85%, preferably 90%, resulting in styrene yields in excess of 70%, preferably in excess of 75%.

In yet another embodiment, dehydrocyclization can also be effected. Thus, $C_6$-$C_8$ paraffins, e.g., hexane, heptane, octane, can be converted into $C_6$-$C_8$ aromatics, e.g., benzene, toluene, ethylbenzene, paraxylene.

The conditions under which the reaction is effected are not generally critical and can be the conditions under which normal vapor phase catalytic dehydrogenation reactions are effected. Thus, reaction temperatures should be at least about 700° F., preferably 800° to 1500° F., and more preferably 900° to 1200° F. Similarly, pressures may vary over a wide range and can range from subatmospheric, e.g., 0.1 atmosphere to superatmospheric, e.g., 50 atmospheres or higher. Preferably, however, pressures may range from about 1 to about 3 atmospheres.

As mentioned above, the dehydrogenation process of the instant invention is carried out in the presence of a sulfur compound. Preferably, the sulfur compound is a sulfur oxide, i.e., $SO_2$ or $SO_3$, or water solutions thereof. However, it is clearly within the purview of the instant invention to employ the sulfur containing compounds in the dehydrogenation zone along with oxygen as is disclosed in U.S. Ser. No. 780,604, filed Dec. 2, 1968, and may consist of cutting the sulfur containing compounds by the addition of oxygen in staged increments throughout the dehydrogenation zone as is described in copending application Ser. No. 780,570, filed Dec. 2, 1968, respectively, the pertinent portions of which are incorporated herein by reference. Thus, carrying out the dehydrogenation process, "in the presence of a sulfur compound," in accordance with the instant invention is meant sulfur compounds, specifically sulfur oxides and the water solutions thereof, either alone or in combination with oxygen.

As has been previously stated herein, it has normally been the practice to utilize relatively large amounts of sulfur dioxide in the dehydrogenation reactions, i.e., see U.S. Pat. No. 3,299,151. As previously mentioned, such high levels of sulfur compound, however, tend to drastically reduce catalyst life by promoting the formation of coke. Now, in accordance with the present invention, a sulfur oxide is employed, i.e., $SO_2$ or $SO_3$ or $SO_2/SO_3$ mixtures or their water solutions $H_2SO_3$, $H_2SO_4$, but preferably $SO_2$, and Table I below shows the levels that can be satisfactorily employed herein:

TABLE I

| | Broad | Preferred | More preferred | Most preferred |
|---|---|---|---|---|
| Mol $SO_2$/mol $H_2$ abstracted | 0.01–1.0 | 0.2–1.0 | 0.2–0.7 | 0.2–0.5 |
| Mol $SO_3$/mol $H_2$ abstracted | 0.007–1.0 | 0.15–1.0 | 0.15–0.6 | 0.15–0.4 |

Molar ratios are based on the amount of $SO_2$ or $SO_3$ present therein. It is noted that the term "mol of hydrogen to be abstracted" is used in conjunction with the sulfur level employed (dehydrogenation occurs by abstraction of hydrogen). Thus, for example, in the dehydrogenation of butane to butene, one mole of hydrogen is abstracted but in the dehydrogenation of butane to butadiene, two moles of hydrogen are abstracted. Therefore, the term is meaningful and directly related to the actual reaction. It is also noticed that the sulfur levels are quite low, relative to the prior art, thereby reducing coke formation tendencies and lengthening catalyst life.

The rate of feeding the dehydrogenatable compound over the catalyst bed, i.e., the space velocity, may vary rather widely, such as from 0.01 w./w./hr. (weight of feed/weight of catalyst/hour) to 10 w./w./hr., preferably 0.05 to 1 w./w./hr., more preferably 0.1 to 0.8 w./w./hr.

It is economically advantageous to use as little steam diluent as possible while accomplishing the above-mentioned criteria of reducing hydrocarbon losses to burning, coking, etc. Generally, at least one mole of steam-mole of dehydrogenatable hydrocarbon is present in the reaction zone. This value, however, is merely an arbitrary limit at which the yield of dehydrogenated product becomes practical and economical. Generally, the conversion and yield to the dehydrogenated compound increase with increased dilution. The upper limit of dilution is a function of the surface area of the catalyst and the reaction temperature. Generally, however, a molar ratio of from 1 to about 20, preferably a molar ratio of from 1 to about 12, and more preferably a molar ratio of from about 4 to about 12 moles of steam per mole of dehydrogenatable compound are employed.

In a typical reaction sequence involving this invention, the feed charge containing ethylbenzene, sulfur dioxide and steam is charged to a suitable reactor containing a magnesium oxide catalyst having an initial surface area of approximately 170 square meters per gram. The charge is heated until it vaporizes and additional heat is added to the reactor to bring the charge to reaction temperatures and to lower the surface area of the magnesium oxide catalyst below the threshold level, i.e., about 80 m.$^2$/g. for achieving high yields to the dehydrogenated product. After the desired degree of conversion has been effected, the reaction product is removed and the effluent is quenched in a condenser to about 500° F. where any sulfur formed is liquefied and removed from the stream for burning to $SO_2$ and recycle. The main effluent is further quenched and any remaining $H_2S$ and $CO_2$ is vented off as gases and the $H_2S$ converted to sulfur and then to $SO_2$ for recycle. The crude styrene product is then separated from the water diluent, e.g., by phase separation, the water recycled and the crude styrene sent to a vacuum distillation tower for purification. Unreacted ethylbenzene is recycled and pure styrene recovered for use as a monomer, for example, for the production of polystyrene.

If a noncondensable diluent had been employed in place of steam, the separation of the crude styrene product would have to be carried out at a lower temperature. Thus, more extensive refrigeration and heat exchange equipment would have to be installed after the reactor. In addition, the oxidation of $H_2S$ to sulfur becomes more difficult and expensive in the presence of the gaseous diluent.

Periodically, for example, after about 12 to 24 hours on stream, it may be necessary to regenerate the magnesium oxide catalyst in order to remove any coke that may have formed on the surface of the catalyst. The magnesium oxide catalyst is regenerated by removing the ethylbenzene and sulfur oxide reactants from the reaction zone and thereafter passing oxygen or an oxygen-containing gas such as air along with steam to burn off the carbonaceous deposits which may have formed on the surface of the catalyst.

The concentration of oxygen in the oxygen/steam regenerating gas should be kept between 4 and 20 mol percent, and more preferably from about 5 to 10 mol percent.

In view of the fact that the surface area of the magnesium oxide catalyst is critical in producing high yields of the dehydrogenated compound and, as mentioned above, in view of the fact that the upper limit of the surface area of the magnesium oxide catalyst is determined by the temperature employed within the reaction zone, it is essential to maintain the temperature of the magnesium oxide catalyst in the regeneration step below about 1800° F., such that the surface area of the magnesium oxide catalyst does not fall below the threshold level for achieving high yields of the desired dehydrogenated product. Preferably, the rate of the oxygen/steam addition should be maintained such that the temperature in the reaction zone when burning off the carbonaceous particles during the regeneration step is maintained at a temperautre below about 1600° F., and more preferably below 1500° F. For example, when the surface area of the magnesium oxide catalyst is in the preferred range of from about 20 to about 60 square meters per gram, it is essential to maintain the temperature of the magnesium oxide catalyst during the regeneration step at a temperature below 1500° F. in order to prevent the surface area of the magnesium oxide going below the preferred range, i.e., 20 to 60 square meters per gram.

After about 20 to about 40 regeneration cycles, the surface area of the magnesium oxide may be increased by removing the reactants from the reaction zone and contacting the magnesium oxide catalyst with $H_2O$, i.e., water or steam at a temperature in the range of from about 33° to about 950° F. and thereafter calcining said $H_2O$-treated magnesium oxide catalyst at a temperature in the range of from about 800° to about 2000° F. for a period of time sufficient to increase the surface area of the spent magnesium oxide catalyst to within the preferred range of from about 20 to about 60 square meters per gram. By increasing the surface area of the magnesium oxide catalyst by the water-treatment and subsequent calcination step is meant to include those instances when the magnesium oxide surface area is below the critically defined range, i.e., below 4 square meters per gram, as well as the situations wherein the surface area may have fallen below the preferred range, i.e., 20 square meters per gram, or the more preferred surface area range of 40 square meters per gram.

Thus, the steps of water-treating and calcining magnesium oxide catalyst can be viewed as maintaining the surface area of the magnesium oxide catalyst within the most preferred range for dehydrogenation, as discussed hereinbefore, as well as for increasing and, in fact, restoring the surface area of the catalyst to that which has been defined as critical in order to selectively dehydrogenate an organic compound in high yields.

Having now described this invention, the following examples will serve to further illustrate the process. However, no limitations are to be implied from these examples since various modifications and variations will be apparent to those skilled in the art.

EXAMPLE 1

This example shows the excellent conversion and selectivity levels obtain when steam is employed as the inert diluent in the dehydrogenation of ethylbenzene to styrene with sulfur dioxide and when the surface area of the MgO catalyst is in the narrowly defined critical surface range, i.e., 54 m.$^2$/g. of the instant invention. Table II shows that, when steam is employed as the inert diluent, the selectivity to styrene increases as the $SO_2$ concentration approaches stoichiometric levels, i.e., from about 0.40 to 0.33 mole of $SO_2$ per mole of ethylbenzene. The optimum yield of styrene is achieved at about 0.37 mole of $SO_2$ per mole of ethylbenzene, when 6 moles of steam per mole of ethylbenzene is employed.

TABLE II

Temperature=1,075° F.
$H_2O$/EB feed mole ratio=6
EB space velocity=0.6 w./w./hr.

| | Percent | | |
|---|---|---|---|
| $SO_2$:EB mole/mole | EB conversion | Styrene selectivity | Styrene yield |
| 0.40 | 91.4 | 91.4 | 83.5 |
| 0.37 | 91.7 | 91.7 | 84.1 |
| 0.35 | 87.6 | 92.9 | 81.4 |
| 0.33 (Stoichiometric) | 80.5 | 93.5 | 75.3 |

EXAMPLE 2

This example shows that when the ethylbenzene dehydrogenation to styrene with $SO_2$ is conducted at elevated pressure, i.e., 20 p.s.i.g., with a surface area of magnesium oxide of about 54 square meters per gram, excellent selectivities and conversion levels to styrene are obtained.

The data in Table III was obtained during 20 successive reaction/regeneration cycles. Each reaction cycle was 6 hours. Each regeneration cycle employed 10% oxygen in admixture with helium/steam and was approximately of one hour's duration.

TABLE III

| | | | | Percent | | |
|---|---|---|---|---|---|---|
| Temp., °F. | EB space velocity, w./w./hr. | Mole/mole $SO_2$ | EB $H_2O$ | EB conversion | Styrene selectivity | Styrene yield |
| 1,000 | 0.5 | 0.4 | 10 | 82.7 | 90.3 | 74.7 |
| 1,050 | 0.5 | 0.4 | 8 | 90.6 | 87.8 | 79.6 |
| 1,050 | 0.7 | 0.4 | 8 | 89.3 | 89.9 | 80.3 |
| 1,050 | 0.7 | 0.35 | 8 | 84.0 | 91.8 | 77.7 |
| 1,075 [1] | 0.7 | 0.35 | 10 | 86.6 | 91.6 | 79.3 |

[1] 86.5% recovery of sulfur as $H_2S$; 20th cycle.

EXAMPLE 3

This example shows the preferred magnesium oxide surface area when dehydrogenating ethylbenzene to styrene at elevated pressures, i.e., 20 p.s.i.g.

TABLE IV

| | | | | Percent | | |
|---|---|---|---|---|---|---|
| MgO surface area, m²/g. | EB space velocity, w./w./hr. | Temp., °F. | Mole $H_2O$/mole EB | EB conversion | Styrene selectivity | Styrene yield |
| 54 | 0.7 | 1,075 | 9 | 86 | 92 | 79 |
| 25 | [1] 0.5 | 1,075 | 8 | 79 | 88 | 70 |
| 25 | 0.3 | 1,050 | 10 | 83 | 91 | 76 |

[1] As surface area decreases MgO catalyst becomes denser. Therefore, to maintain a constant flow rate, the EB space velocity was reduced.

As the data in Table IV indicates, the preferred magnesium oxide surface area for dehydrogenating ethylbenzene to styrene at elevated pressure occurs in the range of about 54 square meters per gram when using 9 moles of steam as the diluent per mole of ethylbenzene. As the surface area of the magnesium oxide catalyst is lowered to 25 square meters per gram, the conversion and selctivity of ethylbenzene to styrene decreases. However, by operating the reaction at more severe conditions, i.e., lower EB space velocity while lowering the temperature, the yield of styrene is significantly increased. Nevertheless, it is clear that the highest slectivity and conversion levels to styrene in the dehydrogenation of ethylbenzene with $SO_2$ occurs at the preferred magnesium oxide surface area of about 54 square meters per gram. Thus, the necessity of low burn-off temperatures in the reaction zone in regenerating the catalyst with steam and an oxygen containing gas, i.e., regeneration step is essential in order to maintain the surface area of the magnesium oxide catalyst at its preferred surface area range of from about 20 to about 60 square meters per gram.

EXAMPLE 4

This example shows the dramatic change in catalyst activity directly attributable to the increase in surface area of a magnesium oxide catalyst due to water-treating and thereafter calcining the water-treated catalyst at elevated temperatures.

TABLE V.—ACTIVATION OF A LOW SURFACE AREA MAGNESIA BY WATER TREATMENT

Reaction............ The $SO_2$ oxydehydrogenation of ethylbenzene to styrene.
Catalyst............ MgO.
Space velocity..... 0.6 gm. ethylbenzene per hour per gm. of catalyst.
Temperature........ 900° F.
Pressure............ Atmospheric.
Mole ratio.......... EB/$SO_2$=1/0.37.

The variation of type and amount of diluent with time throughout a run is given below:

| Mole ratio | | | Time interval in minutes |
|---|---|---|---|
| EB | Diluent | | |
| | He | $H_2O$ | |
| 1 | 4 | 0 | 0–105 |
| 1 | 0 | 4 | 150–195 |
| 1 | 0 | 8 | 150–195 |

| Run No. | Catalyst employed | Time in min. | Diluent in mole/mole EB | | EB conversion | Styrene Selectivity | Yield |
|---|---|---|---|---|---|---|---|
| | | | He | $H_2O$ | | | |
| 1 | MgO (calcined at 1,800° F. for 5½ hours). Surface area=5 m.²/g. | 105 | 4 | 0 | 34 | 81 | 29 |
| | | 150 | 0 | 4 | 13 | 21 | 4 |
| | | 195 | 0 | 8 | 9 | 19 | 2 |
| 2 | The catalyst employed in Run No. 1 was water treated (room temperature) and thereafter calcined at 900° F. for 2 hours. Thereafter the catalyst had a surface area of about 33 m.²/g. | 105 | 4 | 0 | 65 | 87 | 57 |
| | | 150 | 0 | 4 | 47 | 87 | 41 |
| | | 195 | 0 | 8 | 22 | 78 | 17 |

The catalyst used in the first run was MgO that had been reduced to 5 m.²/g. surface area by calcining at 1800° F. for 5½ hours. The same catalyst was employed in the second run but, before use, this catalyst was water soaked to increase its surface area. As seen from results shown in Table V, this procedure resulted in an increase in surface area to 33 square meters per gram while markedly improving catalyst performance in the presence of either helium or water diluent. Thus, in the presence of the helium diluent the styrene yield was only 29 wt. percent for the untreated catalyst versus 57 wt. percent for the treated catalyst, while with the introduction of water diluent the styrene yield was insigificant (less than 5 wt. percent) for the untreated catalyst versus 41 wt. percent and 17 wt. percent for the treated catalyst with 4 moles and 8 moles of water per mole of ethylbenzene, respectively.

EXAMPLE 5

A magnesium oxide catalyst having a surface area of 5 square meters per gram was subjected to steam at atmospheric temperature and at a temperature of 252° F. and then calcined at 900° F. for about 6 hours. After the water-treatment an calcination of the magnesium oxide catalyst, the surface area of the magnesium oxide catalyst had increased from 5 square meters per gram to 82 square meters per gram. This example shows that a steam treatment of a magnesium oxide catalyst followed by calcination likewise effectively increases the surface area of a spent magnesium oxide catalyst.

What is claimed is:

1. A continuous process for the dehydrogenation of a dehydrogenatable organic compound having at least one

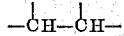

grouping which comprises reacting said dehydrogenatable compound, in the vapor phase, at a temperature in the range from about 800° to about 1500° F. with a sulfur oxide in the presence of an inert diluent over a magnesium oxide catalyst having a surface area in the range of from about 4 square meters per gram to about 80 square meters per gram for a period of time to dehydrogenate said dehydrogenatable compound and thereafter increasing the surface area of the spent magnesium oxide catalyst by contacting said spent magnesium oxide catalyst with $H_2O$ at a temperature in the range of from about 33° to about 600° F. and thereafter subjecting said $H_2O$-treated spent magnesium oxide catalyst to a temperature in the range of from about 800° to about 2000° F. for a period of time to increase the surface area of said spent magnesium oxide catalyst within the range of from about 4 square meters per gram to about 80 square meters per gram.

2. The process of claim 1 wherein the surface area of said magnesium oxide catalyst is in the range of from about 20 square meters per gram to about 60 square meters per gram and wherein said spent magnesium oxide catalyst is contacted with water at a temperature in the range of from about 33° to about 212° F. and thereafter subjecting said water-treated spent magnesium oxide catalyst to a temperature in the range of from about 850° to about 1800° F. for a period of time sufficient to increase the surface area of said magnesium oxide catalyst within the range of from about 20 to about 60 square meters per gram.

3. The process of claim 1 wherein said magnesium oxide catalyst has a surface area in the range of from about 20 to about 60 square meters per gram and wherein said spent magnesium oxide catalyst is contacted with steam at a temperature in the range of from about 212° to about 600° F. and wherein said steam-treated magnesium oxide catalyst is subjected to a temperature in the range of from about 850° to about 1800° F. for a period of time sufficient to increase the surface area of said catalyst to a range of from about 20 to about 60 square meters per gram.

4. The process of claim 1 wherein said dehydrogenatable organic compound is selected from the group consisting of $C_2$–$C_9$ paraffins, $C_3$–$C_9$ monoolefins, $C_8$–$C_{16}$ alkyl benzenes, and $C_8$–$C_{16}$ alkyl and alkyl-substituted cycloaliphatic compounds.

5. The process of claim 1 wherein about 0.2 to about 0.5 mole of sulfur dioxide is employed as the sulfur oxide per mole of hydrogen abstracted from the dehydrogenatable compound.

6. The process of claim 1 wherein steam is employed as the inert diluent and wherein the amount of steam in the reaction zone is in the range of from about 4.0 to about 12.0 moles of steam per mole of dehydrogenatable compound.

7. The process of claim 1 wherein said dehydrogenatable organic compound is ethylbenzene.

References Cited
UNITED STATES PATENTS

| | | | |
|---|---|---|---|
| 3,631,183 | 1/1972 | Pasternak et al. | 260—669 R |
| 2,698,305 | 12/1954 | Plank et al. | 252—420 |
| 2,947,684 | 8/1960 | Johnson et al. | 252—420 |

CURTIS R. DAVIS, Primary Examiner

U.S. Cl. X.R.

260—680 E, 683.3